United States Patent [19]

Apple et al.

[11] 4,305,060

[45] Dec. 8, 1981

[54] DECODER CIRCUITRY FOR SELECTIVELY ACTIVATING LOADS

[75] Inventors: William C. Apple, Brighton; Keith D. Jacob, Ann Arbor, both of Mich.

[73] Assignee: Multi-Elmac Company, Novi, Mich.

[21] Appl. No.: 15,495

[22] Filed: Feb. 26, 1979

[51] Int. Cl.[3] .................. H04Q 9/00

[52] U.S. Cl. .................. 340/825.65; 340/825.34; 340/825.69

[58] Field of Search .......... 340/164 R, 168 B, 167 R, 340/168 R, 347 C; 343/225; 178/22

[56] References Cited

U.S. PATENT DOCUMENTS

| | | | |
|---|---|---|---|
| 3,678,198 | 7/1972 | Ehrat | 178/22 |
| 4,091,361 | 5/1978 | Eichelberler | 340/168 R |
| 4,092,492 | 5/1978 | Eachus | 340/167 R |
| 4,141,010 | 2/1979 | Umpleby | 340/168 R |
| 4,151,517 | 4/1979 | Kelley | 340/347 C |

*Primary Examiner*—Harold I. Pitts
*Attorney, Agent, or Firm*—Krass, Young & Schivley

[57] ABSTRACT

A decoder circuit for selectively activating external loads which finds particular utility in automatic garage door operators. The coincidence of a repeatedly received digital word code with an internally generated local code results in a matched signal, each of the matched signals being stored in an accumulator device. A free running oscillator is used to reset the accumulator if a predetermined number of successive clock pulses are generated without an intervening matched signal. If a given plurality of matched signals are received and stored in the accumulator before it is reset, the accumulator will provide an output signal to a latch which activates the load. Once set, the output latch will not be reset unless a subsequent given number of successive clock pulses are generated without an intervening matched signal. In such manner, the decoder circuitry accommodates a limited number of mismatches possibly due to interference while still maintaining significant security aspects of the decoder circuitry. The resetting of the output latch will not occur immediately upon the occurence of a subsequent mismatch but is delayed to prevent the double trip condition often encountered in the automatic garage door operator field.

12 Claims, 8 Drawing Figures

DECODER CIRCUITRY FOR SELECTIVELY ACTIVATING LOADS

BACKGROUND OF THE INVENTION

This invention relates to radio control systems for the remote actuation of a load. More particularly, it involves a device for encoding and decoding digital electrical signals, with the decoder activating an external load if the received signal corresponds to a preselected code.

Remote actuation of garage door openers and similar loads have been accomplished traditionally by means of a radio control system wherein transmitters and receivers are matched to one another by frequency selection. An inherent disadvantage of this approach is the limited number of available carrier frequencies and the possibility of a match between transmitter and receiver belonging to different persons.

With an increasing awareness of such a potential security problem, the recent trend in providing remotely actuated garage door openers is to provide the owner with the capability of selecting his own personalized code in the transmitter and receiver sections. Many of the recent systems employ digital coding techniques in which the owner selects a particular combination of switches to set the code. Representative examples of known control systems are disclosed in United States Ser. No. 674,595, filed Apr. 7, 1976, now U.S. Pat. No. 4,141,010, issued Feb. 20, 1979 to Umpleby, and assigned to the assignee of the present invention; U.S. Pat. No. 3,906,348 to Wilmott; and U.S. Pat. No. 4,037,201 to Wilmott.

Although the commercially available remote control garage door openers have been gaining wide acceptance, they have been plagued with relatively high manufacturing costs. One of the most expensive items of such systems is the mounting of the various discrete electrical components of the circuitry onto printed circuit boards and the like. The number of discrete components that comprise the circuitry that must be manufactured and assembled bears heavily on the relationship to cost. Efforts have been made to minimize the number of components in such systems utilizing, for example, integrated circuit technology. However, the encoder-transmitter section and the decoder-receiver section have always been considered as separate entities. Consequently, each section was manufactured and designed separately utilizing different components to perform their intended functions. According to the broadest aspect of the present invention, it has been discovered that an encoder-decoder system can be designed having a majority of commonly used functional components. Accordingly, such a circuit can be readily implemented on an integrated circuit device which serves the dual purpose of both the encoding and decoding functions depending merely upon the external connections made to the device. The device of the present invention does not merely duplicate known discrete components into integrated circuit form on different parts of the chip, but utilizes the common functional portions in both modes of operation. Therefore, the cost of such systems can be drasticly reduced by minimizing the chip size and functional portions thereof, the number of external connections made to the device, and by permitting a common packaging scheme for both the encoder and decoder, thereby resulting in lower production costs by improving efficiency of operation.

The prior art has made several attempts to increase the security of remotely actuated control systems. Primarily, they have provided an increasing number of code selecting switches thereby increasing the number of permissible codes. It has also been suggested to delay the actuation of the load until a predetermined number of consecutive codes has been received. Unfortunately, the transmission of the encoded signals may often be in a relatively noisy electrical environment. Consequently, in such an evironment, it is possible for an authorized user to be transmitting the correct code, but not be correctly received for the required number of consecutive times. The number of correct consecutive codes necessary to activate the load could be reduced, but only with the resultant decrease in security. In comparison, a feature of the present invention provides circuitry by which the security of the system is maintained yet accommodates an occasionally erroneous signal due to a noisy electrical environment. Still another feature of this invention gives the user the option of tailoring the tolerance level of the decoder section to determine the degree of correspondence between incoming signals and the comparison or local code that is internally generated by the decoder section. Accordingly, the user in an electrically noisy location is still able to use the system of the present invention by adjusting the tolerance level or degree of permissible error in the decoder.

SUMMARY OF THE INVENTION

According to this invention, there is provided a single integrated circuit device which can be used in both the encoder and decoder sections of a remote control load actuator. The device includes a plurality of input/output ports for making electrical connection between external circuitry and the functional portions of the device. The same pulse generator that provides the encoded digital output signals for the transmitter is utilized in the decoder section to provide a local code in the receiver section against which the received code is compared. If there is a match between the incoming code and the internally generated local code, a signal is provided for actuating a load such as a garage door.

Preferably, the generator is a counter which sequentially accesses the outputs of a plurality of two position switches. The output of the generator provides a series of digital pulses whose widths depend upon the position of the switches followed by predetermined blank or synchronization time before the beginning of the next pulse train. In the encoder mode, the output of the generator is coupled to a transmitter for sending the signal to a receiver. In the decoding mode, the generator output is coupled to a comparator which compares the received incoming code on a pulse-by-pulse basis. Pursuant to another feature of this invention, the amount of deviation or error during this comparison may be adjusted to regulate the amount of allowable difference between the pulse widths of the two signals. If the pulse under comparison meets this test, the counter of the generator proceeds with the next pulse comparison. If all of the pulses and synchronization times match, then the counter is allowed to reach a subsequent stage which is ultimately utilized to activate the external load. According to still another aspect of this invention, the correct code signal from the last counter stage is utilized to increment a security counter which insures that a plurality of correct codes have been received before activating the load. However, provision is made for accommodating a limited number of mismatched signals which may be due to interference before erasing the contents of the security counter. In such manner, the basic security of the system remains intact while tolerating a limited number of erroneous signals which can occasionally be expected in the wide number of applications and use environments of the present invention.

BRIEF DESCRIPTION OF THE DRAWINGS

These and other advantages of the present invention will become more apparent upon reading the following specification and by reference to the drawings in which.

DETAILED DESCRIPTION OF THE PREFERRED EMBODIMENT

Figures 1, 2, 3:
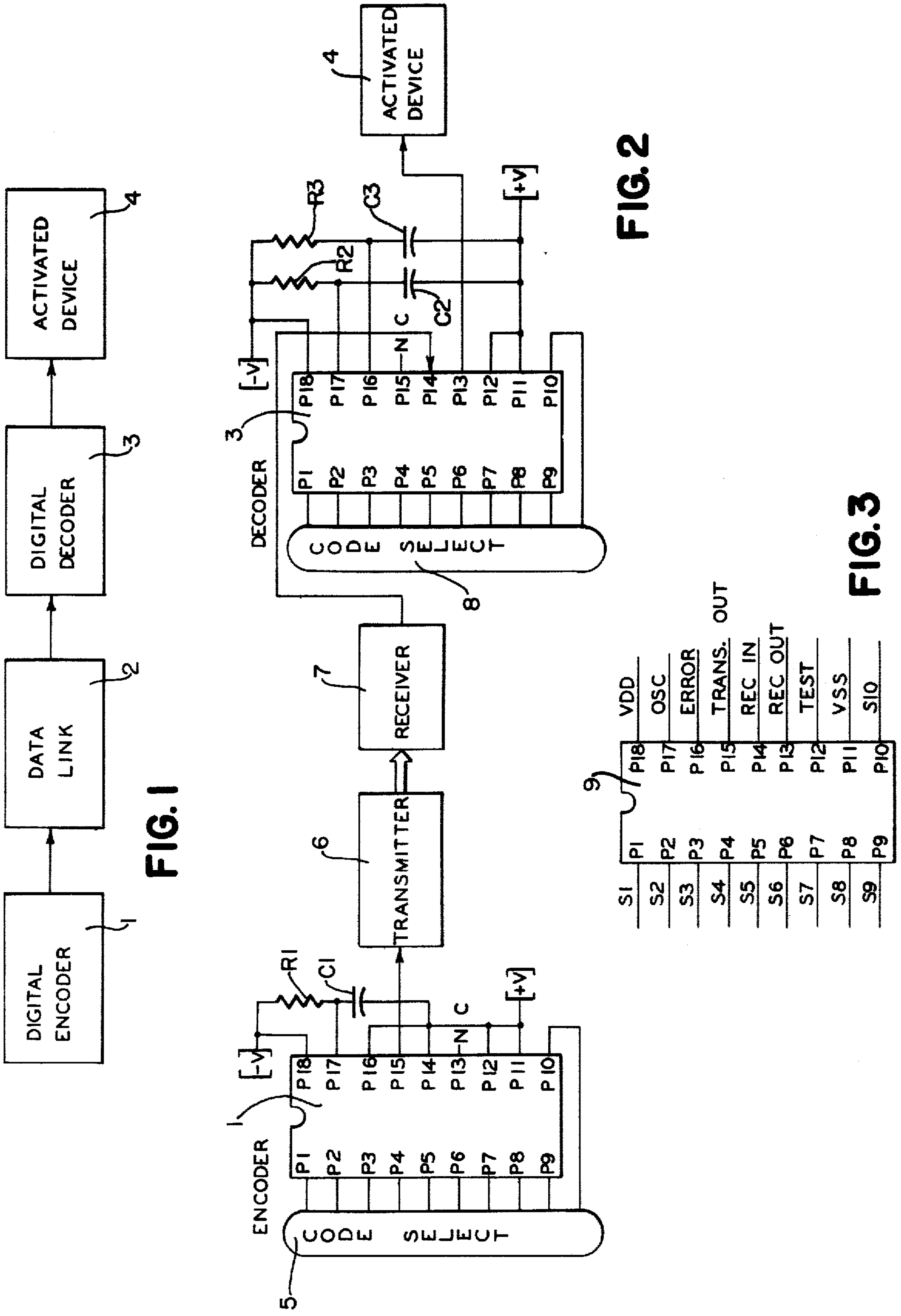
FIG. 1 is a block diagram showing the major components of a system in which the present invention finds particular utility.
FIG. 2 is a block diagram showing in more detail the interconnections of the device of the present invention with the components of the system of FIG. 1.
FIG. 3 is a view illustrating one embodiment of the package of the present device with its input and output ports labeled.

It should be noted from the outset that the present invention, while finding particular utility in a remotely actuated garage door opener environment is ideally suited for any type of communication system in which limited access is desired such as the communication system shown in FIG. 1 which includes a digital encoder 1 for providing signals having a preselected code which are transmitted through a data link 2 to a digital decoder 3, with decoder 3 determining whether the correct signal has been received and, if so, actuating a load or device 4.

Referring to FIGS. 2 and 3, there is shown an example of the implementation of the present invention into a system described in connection with FIG. 1. It should be noted that throughout this description, the same reference numerals will be used to refer to the same components throughout the Figures in order to aid the reader in more fully understanding the operation of the invention.

Pursuant to the present invention, the encoder 1 and decoder 3 utilize exactly the same device and differ only in that the external connections thereto are slightly different. The device of the present invention is preferably packaged in a dual-in-line (DIP) package 9. As shown in FIGS. 2 and 3, package 9 includes a plurality of input/output ports P1–P18. When utilized in the encoder mode, ports P1–P10 are connected to a code select means 5 which, in this example, is a plurality of two position switches or voltages which set the digital code for encoder 1. Ports P11 and P12, P14 and P16 are connected to a suitable positive biasing voltage, while P18 is connected to a suitable negative voltage or ground. Pin P17 is coupled to an external resistor R1 and capacitor C1 to determine a proper oscillating frequency. P15 is the encoder or transmitter output which is fed to transmitter 6 which can be of any variety of types. The most common transmission scheme for garage door openers is a modulated RF signal activated by the digital output signal. However, many other types of transmission devices can be utilized such as infrared systems with modulated light to a pair of wires to send the digital data.

A receiver 7 compatible with the transmitter 6 serves to recover the digital information transmitted and feeds it to the decoder input. The device utilized in decoder 3 is exactly the same as that of encoder 1 except that the external connections to it have been slightly changed. Pin 14 receives the incoming signal from receiver 7. Pins P1–P10 are connected to similar code select switches 8. Code select switches 8, if set to the same code as code select 5, will cause decoder 3 to initiate a signal over pin P13 to activate device 4. Pins P11 and P12 are connected to suitable positive biasing voltages, while pin P18 is connected to a proper negative voltage or ground. Pin P17 is coupled to an internal resistor R2 and capacitor C2 to provide an RC time constant to set a similar frequency to the encoder frequency. Pin P16 is coupled to an external resistor R3 and capacitor C3 which sets the resolution or allowable error between the received signal and the local digital signal developed in the decoder itself as will be fully described later herein. The activated device for the load may be a variety of types including a transistor, relay or other type of switching device which may be coupled to a motor, for example, to activate a garage door opener.

From the foregoing description, it can now be realized that the same device can be utilized as both the encoder 1 and decoder 3 merely by making slight changes to the external connections to the device. Although 18 input/output ports P1–P18 are provided, only changes to four pins, P13–P17, need be made to change the function of the device. This is because the present invention utilizes common functional circuit components in both modes of operation. The following description will describe in more detail the functional portions of the dual purpose device of the present invention in connection with the electronic circuitry. It is important to realize, however, that this circuitry is contained in a semiconductor integrated circuit device 9 which is packaged along the lines shown in FIG. 3. Due to the state of semiconductor technology, it is not necessary to go into any detail regarding the method of manufacture of such a chip since it is well within the skill of an ordinary practitioner to make such a device given the circuitry and layout as will now be described.

Figure 4A:
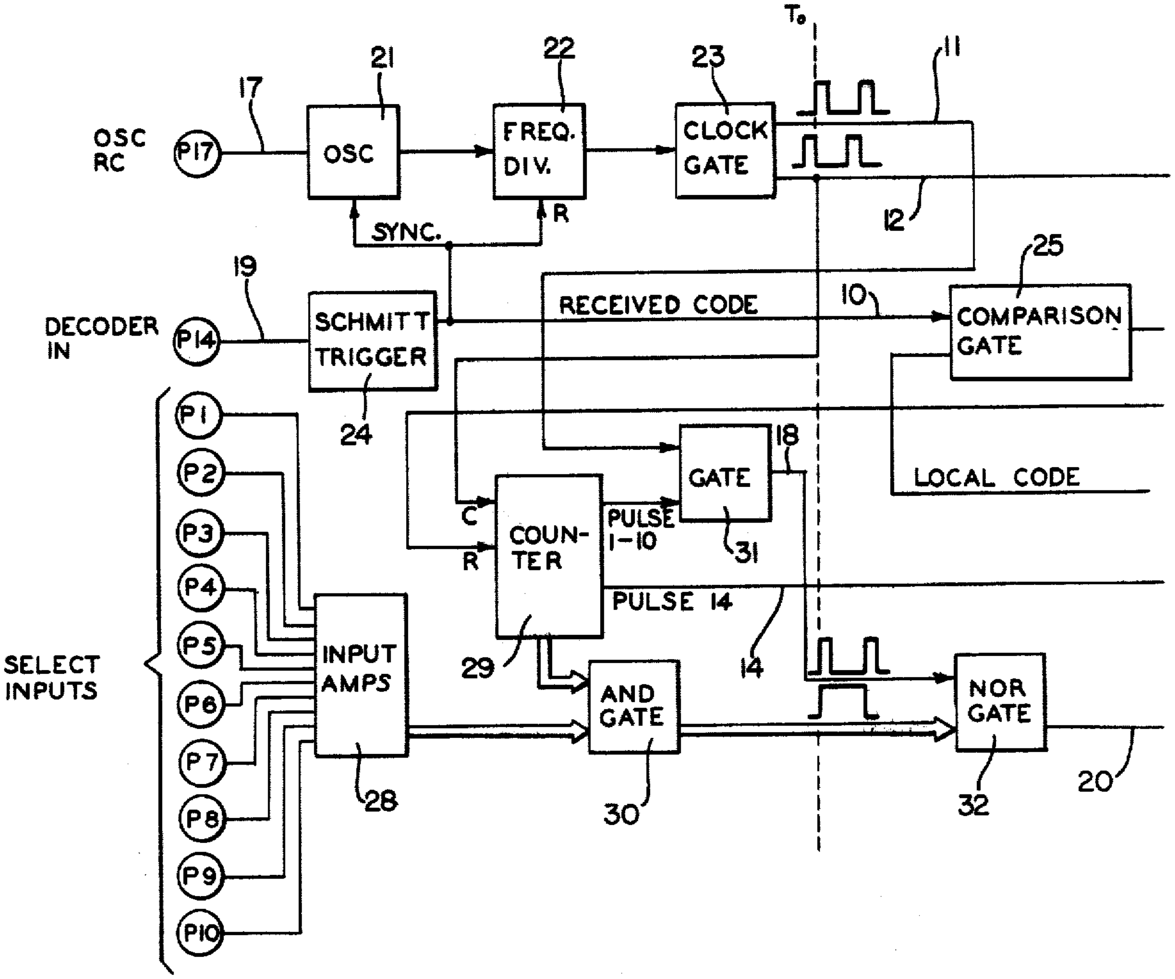
FIG. 4, including 4A and 4B, is a block diagram illustrating the major components of the circuitry of the present invention.
Figure 4B:
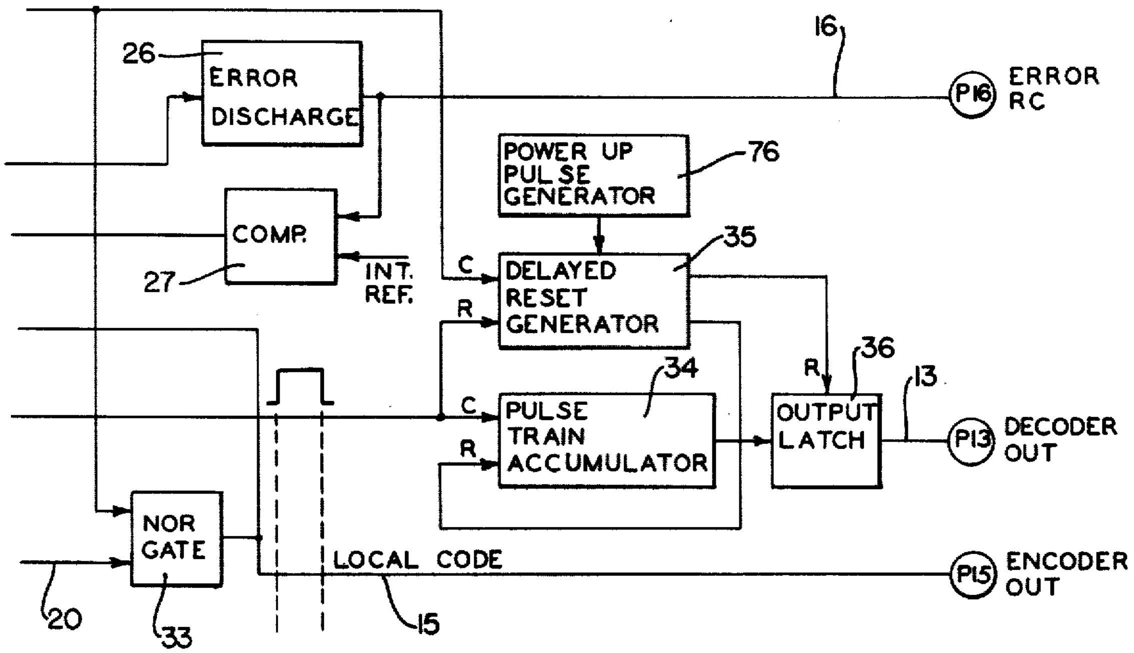

FIG. 4 is a block diagram of the layout of the functional components of the present invention. Oscillator 21 is a free running oscillator having a frequency determined by the external resistor R1 and capacitor C1 connected to pin P17 (see FIG. 2). In the decoder mode, the oscillator 21 is triggered or synchronized on the leading edge of the received input signal coming from the input Schmitt trigger 24. The output of oscillator 21 is coupled to frequency divider 22 which divides the oscillator frequency pulses to develop the desired gating pulses. Similarly, frequency divider 22 is triggered or reset by Schmitt trigger 24 in the decoder mode. The output of frequency divider 22 is fed to the clock gate 23 which provides gating pulses 11 and 12, with gating pulse 11 being high during the first quarter of the clock period determined by divider 22 and pulse 12 being high during the last quarter of the clock period. Clock pulse 11 is coupled to gate 31 whereas pulse 12 is coupled to counter 29, delay reset generator 35, and gate 33.

Figure 5:
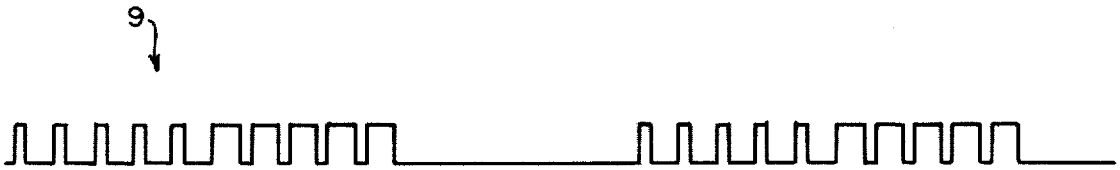
FIG. 5 is a timing chart illustrating the output pulses of the pulse generator of the present invention.

Code select input pins P1–P10 have external voltages applied thereto which set up the particular pulse code. The pins P1–P10 are fed to input amplifier 28 which act as buffers. The output of amplifier 28 is coupled to the input of AND gate 30. AND gate 30 is sequentially gated by counter 29 to individually access one-by-one the outputs of amplifier 28 associated with each code select input. Counter 29, as it counts, provides a series of 16 discrete binary coded output signals, hereinafter referred to as count signals. Consequently, AND gate 30 passes either a high or low signal for the first ten count signals from counter 29 depending upon the code select inputs, and always provides a low signal determining the blank of synchronization times for the remaining 11–16 counts from counter 29. The outputs of gates 31 and 30 are coupled to NOR gate 32 which provides an output pulse of a width depending upon the state of the code select inputs P1–P10. In other words, NOR gate 32 provides ten selective pulses according to the preselected code, followed by a blank synchronization time for six counts during the time counter 29 counts from 11–16. This signal is coupled to NOR gate 33 along with pulses 12 which serve to blank out the last quarter of the clock period. FIG. 5 shows the output from NOR gate 33 when the first five code select switches are not selected and the last five have been selected. Of course, different codes will be provided merely by changing the code select inputs.

In the encoder mode, the output of NOR gate 33, which is referred to as the local code, is coupled to transmitter output pin P15. In the decoder mode, the local code is coupled to one input of a comparison gate 25. The other input to gate 25 is the received code via input pin P14 through Schmitt trigger 24. The leading edge of each received pulse is used to synchronize oscillator 21 and reset frequency divider 23. As in the encoder mode, oscillator 21 runs at a frequency determined by the external resistor capacitor attached to pin P17, but now it is synchronized by the leading edge of the received signal. The local code in the decoder mode is generated in exactly the same manner and utilizes the same components as in the encoder mode. Comparison gate 25 compares the local code and the received code on a pulse-by-pulse comparison basis to determine any pulse width variations. Any differences therein will develop an error pulse at its output. According to a feature of this invention, the error pulse is fed to an error discharge circuit 26 which is fed to pin P16 and connected to an external error time constant resistor R3 and capacitor C3 (see FIG. 2). The value of the external time constant sets the resolution or allowable differences between the local code and the received code. By making the time constant small, the resolution or security of the system is made more secure than other known systems from false or unauthorized signals from being recognized. The output from circuit 26 is then fed to a comparator 27 which compares the amount of error with a reference voltage. When the error voltage exceeds the reference voltage, the comparator 27 resets counter 29. Thus, each time the error between the incoming or received code and the local code is too large, comparator 27 resets counter 29 thus starting the local code generation over again. When ten pulses of the local and received code correspond, the counter will be at count number 10. According to another feature of this invention, a comparison is made of the synchronization times between the received and local codes as well as the pulse widths of each. If there is a comparison of synchronization times, counter 29 will continue to count to count number 16. When it reaches count 14, a signal is fed to accumulator 34 and to delayed reset generator 35. Accumulator 34 will store the number times counter 29 has counted to 14. If there has been a mismatch, accumulator 35 will not receive a count, but will not be reset until for mismatched pulse trains have been detected. If four correct codes have been received before four consecutive mismatched codes are detected, accumulator 34 provides a signal to output latch 36 coupled to pin P13 thereby providing a signal which actuates an external device such as a relay on the motor of the garage door opener. Accordingly, the present invention accommodates for a limited number of mismatched signals which can be expected during use in relatively noisy electrical environments, while at the same time keeping the security of the system intact. On the other hand, if four mismatched signals are detected, generator 35 resets accumulator 34 thereby inhibiting the activation of latch 36. If latch 36 was originally activated due to the receipt by accumulator 34 of the proper number of correctly matched codes, latch 36 will be reset only in the event that reset generator 35 completely times out. In this embodiment, reset generator 35 will time out when a sufficient number of pulses 12 are received to activate its last stage before being reset by a matched signal from counter 29. This will happen when eight mismatches in a row are subsequently detached. When this invention is used in an automatic garage door opener system, this prevents what is known as a "double trip" condition. This occurs when the latch 36 is initially set causing the door, for example, to begin opening. If the operator, while transmitting the code, passes through a "null zone" in which the correct code was not received, latch 36 would be quickly reset but for this provision of the invention. If the latch 36 was reset, when the operator passed out of the "null zone" and the correct code was transmitted again, the latch 36 would be again set thereby causing the garage door to begin closing. However, this "double trip" condition is prevented since this feature of the invention delays resetting or clearing latch 36 only when the reset generator 35 completely times out thereby detecting a greater number of mismatched signals than utilized to clear accumulator 34 alone before it originally provided the output signal to latch 36 for activating it in the first instance. As will be more fully explained herein, reset generator 35 includes a plurality of flip flop stages which are sequentially activated by clock pulses 12. The last stage, if activated, will clear latch 36 whereas the next to last stage will clear accumulator 34. The flip flop stage activation sequence will proceed unless reset by a matched signal from counter 29. Since the clock pulses 12, in this embodiment, are synchronized with the incoming code, the time it takes for the last stage of reset generator 35 to be activated corresponds to eight consecutive mismatched codes, whereas the time to activate the preceeding stage corresponds to only four consecutive mismatched codes.

A power up pulse generator 76 generates a pulse whenever power is first applied to the device. This pulse sets generator 35 which in turn resets accumulator 34 and output latch 36 to clear these components when initially used.

Figure 6A:
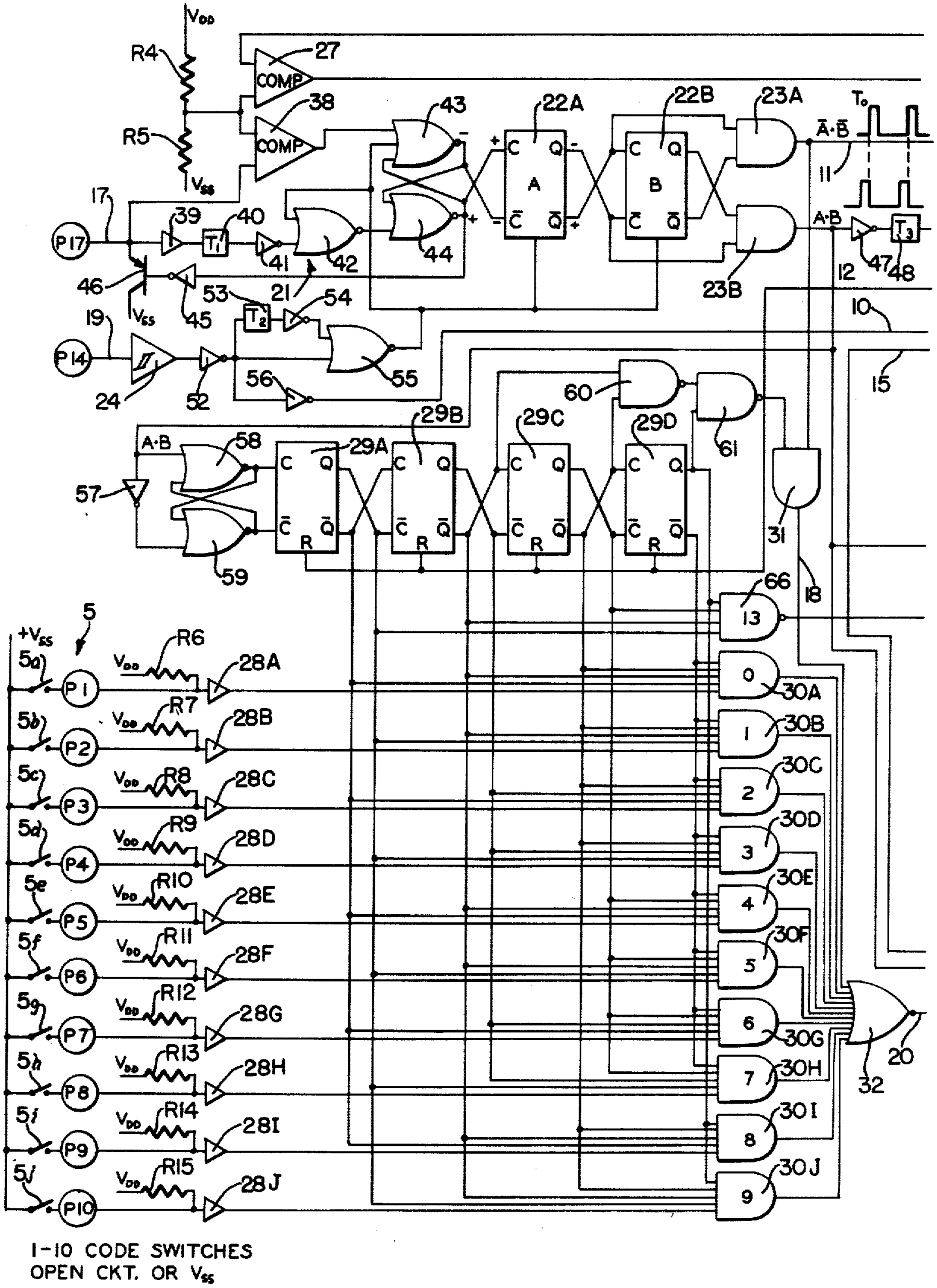
FIG. 6, including 6A and 6B, is a schematic diagram illustrating in detail the components shown in block diagram form in FIG. 4.
Figure 6B:
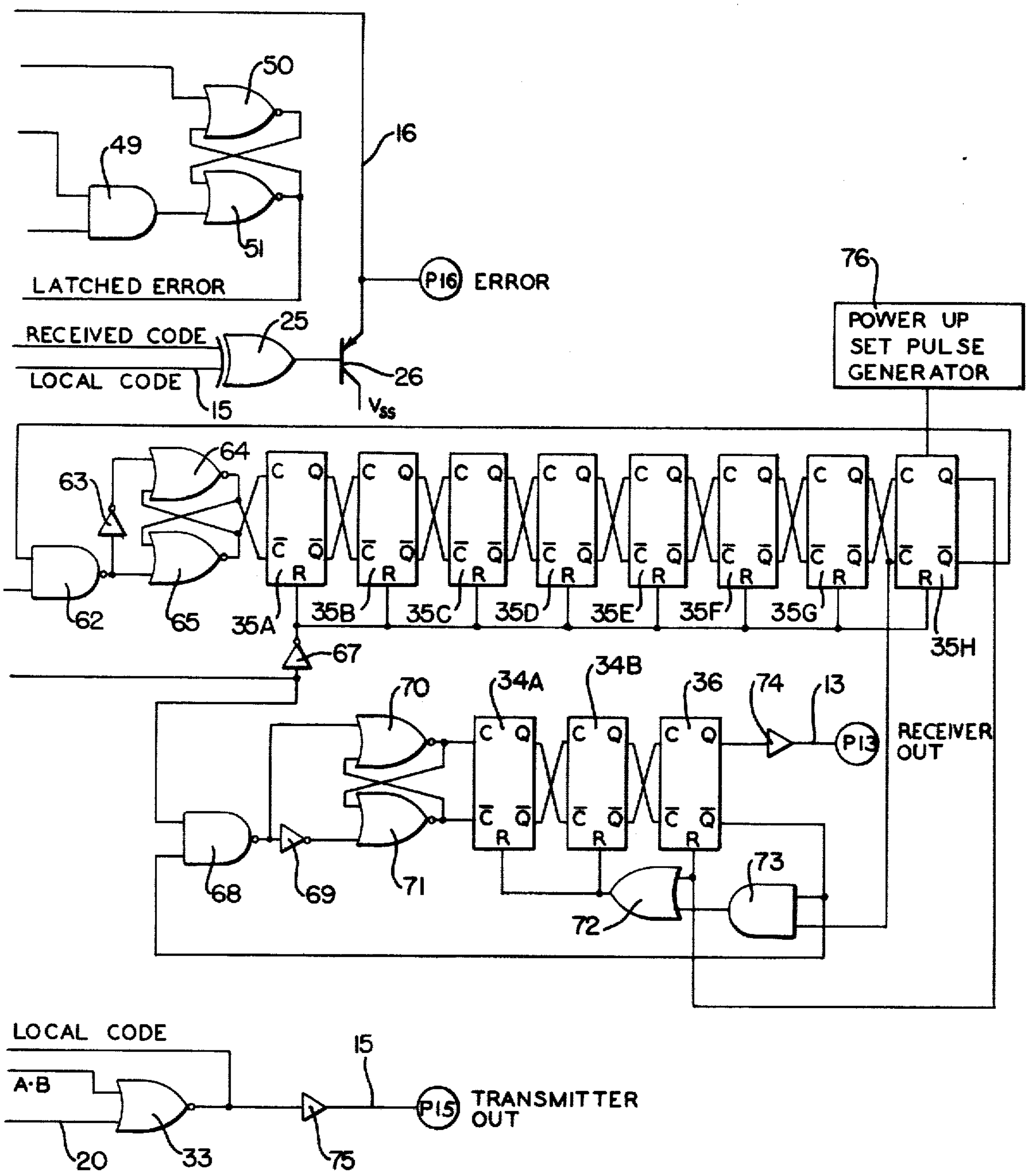

The details of the functional portions of the device previously described are shown in FIG. 6. The device will first be described in connection with use as an encoder and then as a decoder, even though it should now be evident that a majority of the components are utilized in both modes. Again, to aid the reader, the details of the functional blocks will utilize the same reference numerals, but will be followed by a separate letter when appropriate to indicate separate portions of the circuit making up that functional component.

In the encoder mode, oscillator 21 oscillates at the frequency determined by the externally applied resistor R1 and capacitor C1 (see FIG. 2). At time zero or at the first time power is applied, capacitor C1 is discharged and the voltage is applied across the resistor R1. As the capacitor charges, the current through the resistor decreases with the resultant decrease in voltage drop across resistor R1. The voltage at pin C17 is positive and approaches ground as the capacitor C1 charges. The voltage at pin P17 is fed to comparator 38. The other input of comparator 38 is at a fixed reference point and when the voltage of pin P17 drops to that reference voltage, the comparator 38 feeds a high signal to NOR gate 43. NOR gates 43 and 44 comprise an RS (set-reset) storage latch which is self-latching and provides very fast rise and fall times for triggering purposes. When the input to NOR gate 43 goes high, the output goes low and feeds a low signal to the input of NOR gate 44 and to the C input of flip-flop 22A. With the input of NOR gate 44 low, the output of NOR gate 44 goes high and its output is fed to the C of flip-flop 22A, switching the outputs thereof to opposite states until the next high clock input returns the outputs back to their original state, thus dividing down the input frequency. The output of NOR gate 44 is also coupled to inverter 45, making the output of inverter 45 low and turning on PNP transistor 46 which discharges the internal capacitor at pin P17 thereby making the voltage at pin 17 high. The high signal at pin 17 is fed to buffer amplifier 39, then to the time delay circuit 40, and to inverter 41. The output of inverter 41 goes low and is fed to NOR gate 42. The second input of NOR gate 42 is low and used only in the decoder mode. With the inputs low to NOR gate 42, the output goes high and is fed to NOR gate 44 thereby returning the output of latches 43 and 44 to their original state. The output of NOR gate 44 then goes low, causing the output of NOR gate 43 to go high. The low signal at the output of NOR gate 44 is fed back to inverter 45 making its output high and turning off transistor 46 thereby permitting capacitor C1 to begin charging again to continually repeat the process to provide a free running oscillator of the determined frequency.

Flip-flops 22A and 22B comprise a divide by four frequency divider. They are triggered on a leading edge or the positive transition of the pulses. Thus, every other clock pulse flips the outputs of flip-flop 22A and 22B to the opposite state, thereby dividing down the oscillator 21 frequency. The reset inputs to flip-flops 22A and 22B are only used in the decoder mode to reset the flip-flops. AND gates 23A and 23B develop the desired clock pulse widths. With suitable gating, many pulse widths, of course, can be chosen. In this embodiment, AND gate 23A develops clock pulse 11, which is the first quarter of the clock period. The clock period is defined from the leading edge to leading edge of the clock pulses and is equal in time to four complete oscillator cycles. AND gate 23B develops pulse signal 12, which is the last quarter of the clock period. Signal 12 is coupled to NOR gate 58 and inverter 57 which, along with NOR gate 59, comprise an RS storage latch. The negative going trailing edge of pulse 12 toggles the latch and clocks flip-flop 29A on the positive going rise time. Flip-flops 29A, 29B, 29C, and 29D make up a four-stage counter which continuously counts to 16 when clocked unless reset to zero by a positive reset pulse. In the encoder mode, the reset is not used and is held at zero by connecting pin P16 to $V_{SS}$ (+). The outputs of flip-flops 29A–29B are coupled to AND gates 30A–30J. Thus, the binary coded outputs of counter 29 fed to AND gate 30 will sequentially step the code select input voltages to NOR gate 32. Pins P1–P10 are the code select inputs and select the selected code for the encoder. The voltage may be applied to the pin inputs P1–P10 by several means, such as switches, jumpers, transistors or gates. In the embodiment shown in FIG. 6, switches 5A–5J are shown coupled to a suitable voltage source $V_{SS}$. If the switches are not closed, resistors R6–R15 will pull the inputs to $V_{DD}$ or ground. The ten select inputs are fed to buffers 28A–28J. The outputs of buffers 28A–28J are fed to AND gates 30A–30J, respectively. Assume that switches 5A–5E are open, then a low signal will be applied to AND gates 30A–30E from buffers 28A–28E. Similarly, assume that switches 5F–5J are closed. Thus, a high signal will be applied to AND gates 30F–30J through buffers 28F–28J. With this selected input code, as flip-flops 28A–29D count, AND gate 30A–30J will sequentially step firstly five low signals and then five high signals to NOR gate 32 at the clock rate.

NOR gate 32 receives the ten selective clock pulses along with signal 18 from AND gate 31. AND gate 31 gates through pulses 11 as long as the output of NAND gate 61 is high. NAND gate 61, along with NAND gate 60 make up a ten clock-period gate for the first ten clock pulses. Therefore, AND gate 31 passes ten first quarter clock pulses 11 for the first ten clock periods and then supplies a low signal for the next six clock periods. The output of NAND gate 31 is also coupled to NOR gate 32 along with the selected clock pulses from gates 30A–30J. Since NOR gate 32 is an inverter, it passes narrow negative first quarter clock pulses when the code switches are open and negative going clock periods when the code switches are closed. After the ten pulses are provided corresponding to the selected code, a positive blank sync time for six clock periods is produced. This signal 20 from NOR gate 32 is coupled to one input of NOR gate 33. The other input of NOR gate 33 is coupled to pulses 12, which is used to blank out the last quarter of the negative going clock periods from NOR gate 32, thereby providing the local code emanating from NOR gate 33. As shown in FIG. 5, after ten select code pulses, there is a blank sync period of six clock periods used in the decoder to synchronize the received and local codes as well as trigger the decoder outputs. In the encoder mode, the local code 15 is coupled to pin P15 through buffer 75 to be transmitted to the receiver portion.

In the decoder mode, the same components which were utilized in the encoder mode to provide the transmitted signal are also utilized to generate a local code against which the received code is compared. The oscillator 21 oscillates at a frequency depending upon external resistor R2 and capacitor C2. The values of resistor R2 and C2 are chosen to be similar to R1 and C1 so that the oscillators run close to the same frequency as the encoder. The oscillator 21 thus operates in the same manner as previously described. The oscillator 21 freely oscillates unless it receives a sync pulse which comes from the received code at pin 14. Pin 14, the decoder input, receives the incoming pulse train and feeds it through Schmitt trigger 24. Schmitt trigger 24 squares up the rise and fall times of the incoming waveform, and feeds it to inverter 52. The inverted signal is then fed to time delay 53 and inverter 56. The output of inverter 56 is the received pulse code pin which is coupled to exclusive OR gate 25 for comparison with the local developed code. When the output of inverter 52 goes low, which is the leading edge of each pulse, both inputs of NOR gate 55 are low thereby causing the output of NOR gate 55 to go high. The output is fed to NOR gate 43 to reset oscillator 21 and flip-flops 22A–22B to reinitiate the clock. The outputs of NOR gate 55 remain high only to generate a narrow positive pulse. Time delay 53, inverter 54, and NOR gate 55 comprise a one shot multi-vibrator. When the low at the output of inverter 52 is fed to the input of NOR gate 55 and time delay 53, both inputs of NOR gate 55 are low. However, when the time delay has elapsed, inverter 54 inverts the low at its output to a high signal, thereby causing the output of NOR gate 55 to become low again, thereby generating the narrow positive sync pulse at the leading edge of each received pulse for synchronizing the oscillator 21 and resetting the dividers 22A and 22B.

Flip-flops 22A and 22B thus reset by the incoming pulse code, provide the oscillator frequency and feed the AND gates 23A and 23B to develop the local clock signals 11 and 12. The output 12 from AND gate 23B is coupled through the latch comprised of inverter 57, and gates 58, 59 to clock the counter flip-flops 29A–29D. The local code for the decoder is then generated in exactly the same manner as the encoder, using the same components. Counter 29 will sequentially count first to ten, thereby transferring the local code data from switches 5A–5J to the output of NOR gate 33, and then continue to count to 16 before it repeats unless it receives a reset pulse that starts the counting process over again. The local code in the decoder mode is fed to exclusive OR gate 25. Gate 25 compares the local code 15 to the received code pulse 10 on a pulse-by-pulse comparison basis. If the pulses continuously match, the output of exclusive OR gate 25 will remain low, keeping PNP transistor 26 turned on and the error pin 16 in the high state. However, when any pulse or part of a pulse does not exactly coincide, the output of gate 25 will go high, turning off transistor 26. Externally connected capacitor C3 to pin 16 as well as resistor R3 will determine the time constant as to how fast the capacitor will charge. The charge time constant determines how much resolution or allowable error the two compared signals can have before a reset pulse is generated. As long as transistor 16 is on, pin 16 is held high, keeping the external capacitor discharged. The instant an error is detected, transistor 26 turns off and the voltage $V_{SS}$ is applied across the external resistor R3 keeping pin 16 high. As the capacitor C3 charges, the current through the resistor R3 drops and, accordingly, so does the voltage across the resistor R3. The voltage at pin 16 is coupled to comparator 27 and is compared with a reference voltage developed by resistors R4 and R5. When the voltage at pin 16 drops to the reference level, after an error has occurred, the comparator output goes high, thereby flipping error latch comprised of gates 50–51. With a high applied to NOR gate 50, its output goes low and is fed to NOR gate 51. The other input of NOR gate 51 is normally low and is controlled by the clock through AND gate 49. With both inputs of NOR gate 51 low, its output will go high feeding back a high signal to NOR gate 50 thereby locking up the error latch. The high signal at the output of NOR gate 51 is also coupled to the reset input of counter flip-flops 29A–29D. Accordingly, the counter 29 ceases its counting process upon receipt of a signal from the error detection circuitry signifying a mismatch beyond a tolerated level between a pulse of the received code and a corresponding pulse of the local code. The amount of tolerance permitted is adjustable by changing the values of resistor R3 and/or capacitor C3 determining the time constant. For example, this can be accomplished by making resistor R3 a variable resistor which can be manually adjustable as shown in FIG. 2. Counter 29 remains reset until NOR gate 51 is unlatched by a signal from AND gate 49. The inputs of AND gate 49 are coupled to waveforms 11 and 12. The output of AND gate 49 thus will go positive on the leading edge of the output time delay 48 which will occur slightly after clock pulse has reached counter flip-flops 29A–29D. This reset delay presents the counter 29 from clocking until the second clock pulse occurs and at that time the counter 29 also steps to the second decode select position.

Counter flip-flops 29A–29D continue to step through or count as long as there is no detectable error. In this embodiment, the sync time as well as the pulses of the received and local codes are compared. If this comparison corresponds such that counter 29 reaches count 14, the output of NAND gate 66 goes low. The output of NAND gate 66 is coupled through inverter 67 thereby resetting the delayed reset generator flip-flops 35A–35H. The "14" count signal from counter 29 is also fed to NAND gate 68. The other input of NAND gate 68 is high until the pulse train accumulator flip-flops 34A and 34B cause the output latch 36 flip-flop to flip and block any more of the "14" pulses. At the end of the "14" pulse, the output of NAND gate 68 goes low from the leading edge of the "15" clock pulse. The output of NAND gate 68 is fed through inverter 69 to NOR gate 71 and NOR gate 70. The high signal at the input of NOR gate 71 flips the output low, which is sent to NOR gate 70. Both inputs of NOR gate 70 become low, thereby causing the output to go high thereby clocking pulse train accumulator flip-flops 34A and 34B. After four complete proper pulse trains with blank sync time, the pulse train accumulator 34A and 34B will then clock the output latch 36 giving a high signal at its output through buffer 74 to output pin 13. The output latch 36 feeds back a low signal to NAND gate 68 blocking any more "14" clock pulses to the pulse train accumulator 34. The pulse train accumulator 34 and output latch 36 is reset by the delayed reset generator flip-flops 35A–35H.

The delayed reset generator 35 requires a total of 128 clock pulses or a total of eight pulse trains with errors to trigger the Q output of flip-flop 35H to go high and the Q output to go low, thereby blocking the clock input to NAND gate 62. Normally the Q output of flip-flop 35H is high because of the "fourteen" pulses on NAND gate 66 through inverter 67 which resets the delayed reset generator flip-flops 35A–35H after every good pulse train. This reset signal puts all of the Q flip-flop outputs high and starts the reset 35 over. The output of Q flip-flop 35H is fed back to the one input of NAND gate 62 allowing the clock pulse 12 to trip latch 64 and 65 along with the inverter 63. When both inputs of NAND gate 62 go high, the output thereof goes low and is fed to NOR gate 65 and inverter 63. The output of inverter 63 thus goes high which flips NOR gate 64 causing its output to go low. Accordingly, both of the inputs of NOR gate 65 are low causing its output to go high and to clock flip-flop 35A. Each clock pulse will step the delayed reset generator 35 unless it is reset by a good pulse train represented by the "fourteen" count signal. There are two reset lines from the delayed reset generator 35. One is used to reset only the pulse train accumulator 34, with the other to reset both the accumulator 34 and output latch 36.

When data is transferred from one point to another, be it by a pair of wires or by air through an RF transmitter, some or all of the information can be lost or changed. Accordingly, the receiver may detect a mismatch between the received code and the transmitted code even though the originally transmitted code did match the internally generated local code in the receiver. According to another feature of this invention, provision is made for tolerating a limited number of mismatched codes which may be due to interference and not due to an incorrectly transmitted code. The delayed reset generator 35 counts the number of clock pulses between good pulse trains. If the delayed reset generator 35 reaches 64 counts, equivalent to four pulse trains, before latch 36 is activated, it feeds a high signal through AND gate 73 and OR gate 72 to reset the pulse train accumulator flip-flops 34A and 34B. However, accumulator 34 is designed so that it can count properly matched pulse trains before four mismatched pulse trains are detected in which case accumulator 34 is reset and must start the process over again. If accumulator 34 does reach four good pulse trains and trips output latch 36, the output of latch 36 goes high and the Q output goes low feeding a low signal to NAND gate 73 thus blocking the reset signal from the Q output of flip-flop 35G. In order to reset the output latch 36 and accumulator 34, it takes 128 clock pulses in a row from generator 35 which is equivalent to 8 incorrect pulse trains. In other words, once the output latch 36 has been activated to actuate the output load, it takes 8 incorrect pulse trains to reset both the latch 36 and accumulator 34. This is in comparison to only four mismatch pulse trains to reset only accumulator 34 before it is set. After receiving 128 clock pulses without a good pulse train to reset generator 35, the Q output of flip-flop 35H will go high and reset output latch 36, as well as accumulator 34 through OR gate 72.

When power is initially applied to the system, flip-flop 38H is set by power up set pulse generator 76, thereby making the Q output high to reset the output latch 36 and the pulse train accumulator 34 so that the output at pin 13 is not high when power is first applied.

It should be understood that the preceding description sets out the preferred embodiment of the present invention according to the mandates of the patent statutes. However, many modifications of the unique concepts disclosed herein should become apparent to one skilled in the art after reading the preceding description. Therefore, while this invention has been described in connection with particular examples thereof, no limitation is intended thereby except as defined by the appended claims.

The embodiments of the invention in which an exclusive property or privilege is claimed are defined as follows:

1. In an automatic garage door operator system using a decoder circuit having comparison means for comparing a repeatedly received digital word code signal with an internally generated local digital word code signal on a sequential pulse-by-pulse basis, with said circuit providing a matched or mismatched output signal depending upon the coincidence between the pulses of the received and local code signals, the improvement comprising:

oscillator means for providing a series of independently generated clock pulses;

accumulator means coupled to the output of said comparison means for storing a plurality of said matched signals;

an output latch means coupled to the output of said accumulator means, operative to activate the door in response to an output signal from the accumulator;

reset means coupled to said accumulator means for clearing the contents of said accumulator upon the generation of a given number of successive clock pulses from said oscillator without an intervening matched signal being generated by said comparison means; and said accumulator means being operative to provide said output signal to activate the garage door upon receipt of a predetermined number of matched signals regardless of their sequence before said accumulator is cleared by said reset means thereby accomodating a limited number of mismatched signals possibly due to interference.

2. The improvement of claim 1 wherein said reset means further includes means for clearing said latch means upon detection of a given number of subsequently generated clock pulses without an intervening match signal.

3. The improvement of claim 2 wherein said reset means comprises:

a plurality of flip flop stages which are sequentially activated by said clock pulses, means for resetting said flip flop stages to begin the sequential activation process over again upon receipt of a matched signal, the output of the last stage being coupled to said latch means and to said accumulator means to set both of them if the last stage is activated, and the output of a preceding stage being coupled to the accumulator to reset said accumulator alone when said preceding stage is activated whereby said latch means is cleared only when the reset means subsequently detects a greater number of clock pulses than utilized to reset the accumulator alone before it originally provided the output signal to the latch means for activating it in the first instance.

4. The improvement of claim 3 which further comprises:

generator means for generating said local code, said generator means including a counter for sequentially providing a plurality of count signals;

said counter upon reaching a predetermined count providing a match signal which is stored in said accumulator and utilized to clear the reset means whereby said reset means is re-initialized to begin counting said clock signals in order to activate the last and preceding flip-flop stages.

5. In an automatic garage door operator using a decoder system having comparison means for comparing a received signal with a local code signal, with said comparison means providing a matched signal upon coincidence between the received and local code signals, the improvement comprising:

oscillator means for generating a series of clock pulses independently of said signals;

output latch means for activating a load;

means for initially setting said output latch to activate the load in response to at least one matched signal; and reset means for clearing said latch means only after a predetermined time delay defined by the generation of a given number of successive clock pulses from said oscillator without an intervening matched signal from said comparison means.

6. The improvement of claim 5 wherein said means for setting the latch means comprises storage means for storing a given number of matched signals from the comparison means, operative to set said latch means upon receipt of said given number of matched signals, and wherein said reset means is operative to reset said storage means after the generation of M clock pulses without an intervening matched signal, said reset means being further operative to clear said latch means after the generation of N clock pulses without an intervening matched signal, where N is greater than M.

7. In a decoder circuit for selectively activating an external load depending on the contents of a repeatedly received digital word code defined by a series of pulses having different characteristics, said decoder including comparison means for comparing on a pulse-by-pulse basis the received code with an internally generated local code, the improvement comprising:

local code generator means including a counter for sequentially providing a plurality of count signals;

oscillator means for providing a plurality of clock signals;

accumulator means coupled to said counter means, operative to store a plurality of matched signals therein, each of said matched signals being a predetermined count signal from the counter means which is generated upon coincidence of all of the pulses in the local and received codes;

output latch means coupled to said accumulator means, operative to activate a load in response to an output signal from said accumulator means;

reset means having a clock input and a reset input, said clock input being coupled to said oscillator means and said reset input being coupled for receipt of said predetermined count signal from said counter means, said reset means having an output coupled to a reset input of the accumulator means wherein said reset means clears said accumulator means after receiving a predetermined number of clock pulses unless reset beforehand by said predetermined count from said counter indicating a match between the local and received codes; and said accumulator means being operative to provide said output signal to the latch to activate the load upon receipt of given plurality of matched signals before being reset.

8. The improvement of claim 7 wherein said reset means comprises a plurality of flip flop stages which are sequentially activated by said clock signals, the output of one flip flop stage being coupled to said latch means for resetting it if the one flip flop stage is activated, and the output of a preceding flip flop stage being coupled to the accumulator means to reset said accumulator when said preceding stage is activated.

9. The improvement of claim 8 wherein said output latch is not originally set unless a given plurality of matched signals are received by the accumulator before said preceding flip flop stage of the reset generator means clears said accumulator means, and wherein said output latch is cleared only upon activation of the one flip flop stage of the reset means which occurs after activation of said preceding flip flop stage.

10. The improvement of claim 7 wherein each of said matched signals is defined by a given count signal from said counter which is generated upon coincidence of all of the pulses in the local and received codes as well as a synchronization signal between successive codes.

11. In a decoder circuit having comparison means for comparing a received digital code signal with an internally generated local digital code signal on a pulse-by-pulse basis, with said circuit providing an output signal for activating a load if said received and local codes coincide, wherein the improvement comprises:

transistor means having an input coupled to the output of said comparison means;

a resistor-capacitor network coupled to the output of said transistor means;

reference voltage means for providing a reference voltage and a second comparator having one input coupled to the output of the network and its other input coupled to said reference voltage means wherein said comparison means provides an error signal of a time duration equal to the difference between the pulse widths of the received and local codes, said error signal causing said transistor means to charge the capacitor and provide a voltage level to said second comparator, with said second comparator providing an output signal signifying an untolerated mismatch if said voltage level exceeds the reference voltage level.

12. The improvement of claim 11 which further comprises means coupled to said resistor-capacitor network for altering the RC time constant thereof to regulate the amount of error signal necessary to charge the capacitor above the reference voltage level.

* * * * *